(12) United States Patent
Rosart et al.

(10) Patent No.: US 8,577,668 B2
(45) Date of Patent: *Nov. 5, 2013

(54) DISPLAYING ORIGINAL TEXT IN A USER INTERFACE WITH TRANSLATED TEXT

(75) Inventors: Daniel Rosart, Mountain View, CA (US); Owen Otto, San Francisco, CA (US); Jeffrey Chin, Sugar Land, TX (US); Sha-Mayn Teh, San Francisco, CA (US); John Hawkins, San Francisco, CA (US); Anton Andryeyev, San Jose, CA (US); Karel Driesen, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/316,948

(22) Filed: Dec. 12, 2011

(65) Prior Publication Data

US 2012/0084073 A1 Apr. 5, 2012

Related U.S. Application Data

(63) Continuation of application No. 12/886,512, filed on Sep. 20, 2010, now Pat. No. 8,095,355, which is a continuation of application No. 11/537,796, filed on Oct. 2, 2006, now Pat. No. 7,801,721.

(51) Int. Cl.
*G06F 17/20* (2006.01)
*G06F 17/28* (2006.01)
*G06F 3/00* (2006.01)
*G10L 21/00* (2013.01)

(52) U.S. Cl.
USPC .............................. 704/2; 704/277; 715/703

(58) Field of Classification Search
None
See application file for complete search history.

(56) References Cited

U.S. PATENT DOCUMENTS

| | | | |
|---|---|---|---|
| 5,995,101 | A | 11/1999 | Clark et al. |
| 6,119,078 | A | 9/2000 | Kobayakawa et al. |
| 6,438,515 | B1 | 8/2002 | Crawford et al. |
| 6,647,364 | B1 | 11/2003 | Yumura et al. |
| 7,358,956 | B2 | 4/2008 | Hinckley et al. |
| 7,496,230 | B2 | 2/2009 | Chen et al. |
| 7,509,318 | B2 | 3/2009 | Shaath et al. |
| 2003/0200505 | A1 | 10/2003 | Evans |
| 2005/0028107 | A1 | 2/2005 | Gomes et al. |
| 2005/0197826 | A1 | 9/2005 | Neeman |
| 2006/0080082 | A1 | 4/2006 | Ravindra et al. |

(Continued)

FOREIGN PATENT DOCUMENTS

| | | |
|---|---|---|
| CN | 1179576 A | 4/1998 |
| EP | 1622040 A2 | 2/2006 |

(Continued)

OTHER PUBLICATIONS

International Search Report, PCT/US2007/080079, Jan. 28, 2008, 18 pages.

(Continued)

*Primary Examiner* — Brian Albertalli
(74) *Attorney, Agent, or Firm* — Remarck Law Group PLC (57) ABSTRACT

Methods, systems, and apparatus, including computer program products, for user interaction with machine translation. A user interface for receiving requests to translate text and/or documents from a first language text to a second language text. The translated text and/or document is displayed such that the first language text corresponding to a selected portion of the second language text can be accessed and displayed in the same user interface.

24 Claims, 11 Drawing Sheets

(56) References Cited

U.S. PATENT DOCUMENTS

| | | |
|---|---|---|
| 2006/0100849 A1 | 5/2006 | Chan |
| 2007/0244691 A1 | 10/2007 | Alwan et al. |
| 2008/0077384 A1 | 3/2008 | Agapi et al. |
| 2009/0240485 A1 | 9/2009 | Dalal et al. |

FOREIGN PATENT DOCUMENTS

| | | |
|---|---|---|
| JP | 2002091962 A | 3/2002 |
| JP | 2002287862 A | 10/2002 |
| JP | 2003345801 A | 12/2003 |
| JP | 2005202739 A | 7/2005 |
| WO | WO-9928831 A1 | 6/1999 |
| WO | WO-0175662 A2 | 10/2001 |
| WO | WO-2005086021 A2 | 9/2005 |
| WO | WO-2006016477 A1 | 2/2006 |

OTHER PUBLICATIONS

International Preliminary Report on Patentability, PCT/US2007/080079, Apr. 16, 2009, 9 pages.

Notification of the First Office Action (for a PCT Application entered into Chinese National Phase) for Chinese Application No. 200780043504.X dated May 12, 2010 including English Translation, 8 pages.

Notification of the Second Office Action (for a PCT Application entered into Chinese National Phase) for Chinese Application No. 200780043504.X dated Aug. 17, 2011 including English Translation, 14 pages.

"Readings on Microsoft Windows & WOSA self-study training kit first edition," Japan, Microsoft Co., Nov. 30, 1995, First edition, p. 63.

Mamoru Fukuzumi, Mouse cursor controlled casual dictionary tool: Dr. Mouse <Just System>, Internet ASCII, Japan, Ascii Co., Jun. 1, 1999, Fourth vol., No. 6, p. 178.

DISPLAYING ORIGINAL TEXT IN A USER INTERFACE WITH TRANSLATED TEXT

CROSS-REFERENCE TO RELATED APPLICATIONS

This application is a continuation of U.S. patent application Ser. No. 12/886,512 filed on Sep. 20, 2010 which is a continuation of U.S. patent Ser. No. 11/537,796 filed on Oct. 2, 2006, now U.S. Pat. No. 7,801,721. The entire disclosures of each of the above applications are incorporated herein by reference.

BACKGROUND

This specification relates generally to information systems.

Users seeking to translate text or speech from one language into another often accomplish this through the use of machine translation systems. Like translation done by humans, machine translation does not simply involve substituting words in one language for words in another, but the application of complex linguistic knowledge.

Accurate translation requires an understanding of the text, which includes an understanding of the situation and a variety of facts. Grammatical rules can be memorized or programmed, but without real knowledge of a language, a computer simply looks up words in a dictionary and has no way to select between alternate meanings. Sometimes a name will be misinterpreted as a word or the wrong sense will be chosen for a word that can be used in multiple senses. To provide users an understanding of how text was translated, user interfaces to machine translation services often provide a way to view the untranslated text with the translated text so users can refer back to the original text. Typically, this is accomplished by interleaving the original text and translated text, providing the translated text in a separate window or frame.

SUMMARY

This specification describes systems and methods for translating documents and/or text from a first source language to a second target language. In some implementations, a resource in a first language is specified and a translated version of the resource in a second language is provided. Access to the text of the original resource in the first language text is provided within the same interface that is displaying the translated version of the resource. In some implementations, the access is provided via pop-ups (e.g., tooltips) which appear after a use points to text in the translated resource. The first language text can be shown until the user ceases point to the text in the translated resource.

In some implementations, the translated resource is reformatted in a structure appropriate for the second language text. In some implementations, a navigation frame is generated to provide feedback to the user, such as errors in the translation and/or formatting from the first language text to the second language text. In some implementations, frames in the original resource are removed when formatting the translated version of the document.

In some implementations, received text to be translated from a first language text to a second language text is received within a user interface. The translated text is displayed in an output area within the user interface. In some implementations, where the received text does not correspond with the first language text, an error message can suggest an appropriate first language text.

In some implementations, a user interface is provided having an input section for receiving a location of a resource to be translated from a first language text to a second language text, and a presentation area for displaying a translated resource. In one example, predetermined text structures within the translated resource are selectable to view the corresponding first language text within the presentation area.

Advantages that can be seen in implementations described in this specification include one or more of the following. The reader of the translated text or resources is provided with easy access to the original untranslated text. However, if the user does not need to see the untranslated text, it is not displayed so it does not interfere with the viewing of the translated text. This reduces the distractions caused by display the untranslated and translated text together, especially if the text directions for the untranslated and translated text are different (e.g., English and Arabic), or if displaying the untranslated text interferes with the document's layout.

The details of one or more embodiments of the subject matter described in this specification are set forth in the accompanying drawings and the description below. Other features, aspects, and advantages of the subject matter will become apparent from the description, the drawings, and the claims.

DRAWINGS

Like reference symbols in the various drawings indicate like elements.

DETAILED DESCRIPTION

Figure 1:
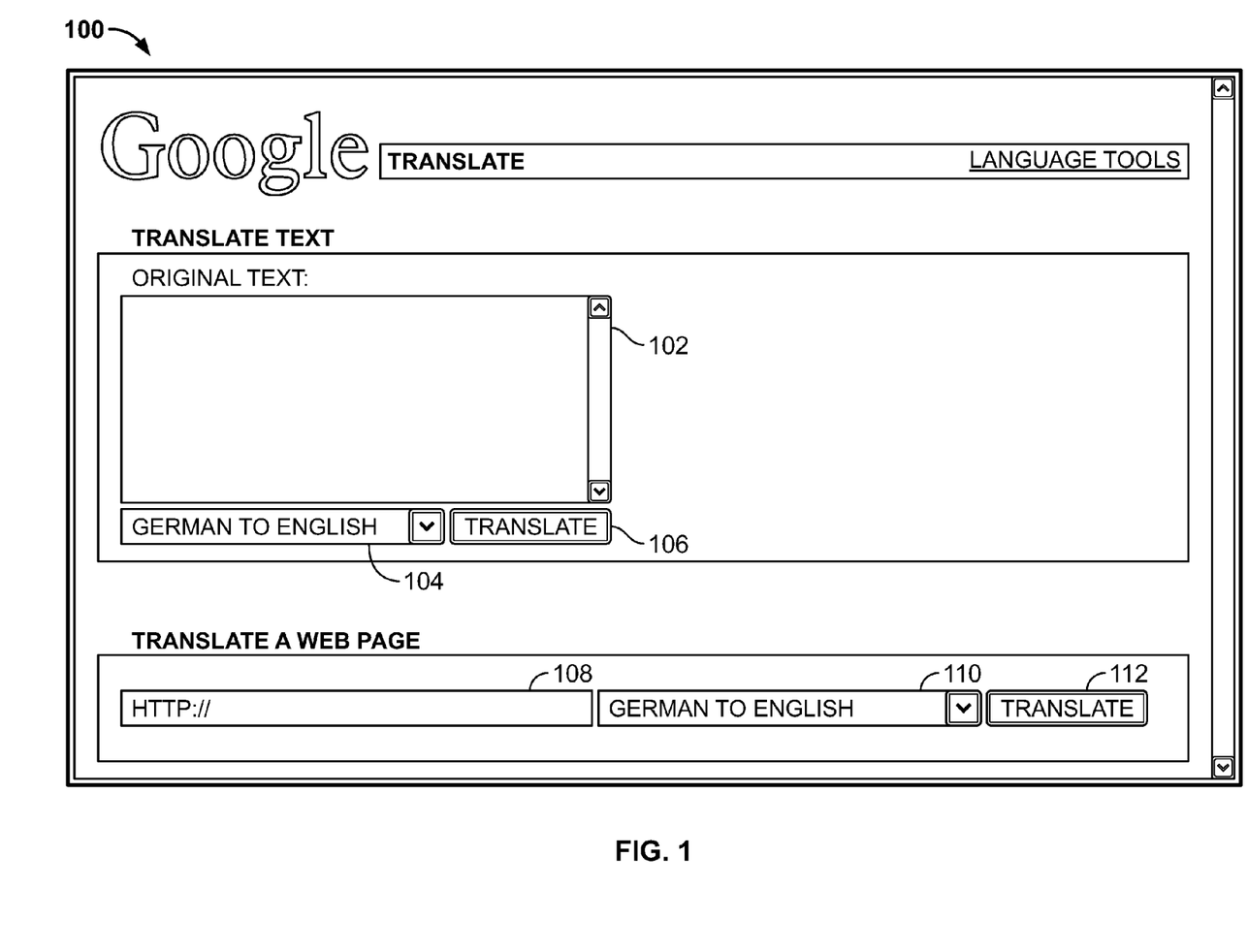
FIG. 1 illustrates an example translation engine user interface.

FIG. 1 illustrates an example translation user interface 100. The user interface 100 can be provided by a translation engine to a client user interface, such as a web browser. Generally, a client is an instance of a computer program on a general purpose computer that is capable of presenting a user interface provided by the translation engine. The client is also capable of accepting user interaction from the user and providing it to the translation engine. A client can be instantiated on various mobile and tethered computing devices, for example, personal computers, workstations, mobile computers, laptop computers, electronic games, media players, mobile phones, combinations of these, and other suitable computing devices. A client can be implemented in software, firmware, hardware or combinations of these. The client and the translation engine can be instantiated on the same computing device or on separate computing devices connected by one or more wired or wireless networks (e.g., the Internet), including a local area network or a wide area network.

The user interface 100 can be provided by a translation engine as an encoded resource such as a Hypertext Markup Language (HTML) encoded document. As used in this specification, the term "resource" refers to digital data entities of every kind that can be identified, named, addressed or handled, in any way, in a computer or a data processing system. In general, the user interface can be encoded in a document using an alternative encoding, a combination of encodings or a combination of different resources and encodings. For example, the HTML document can also contain client-side instructions encoded as JavaScript, which can be used to affect the user interface in response to user input. The user interface can be configured by the translation engine. By configuring the user interface the translation engine specifies what user interface elements are included in the encoded user interface.

The user interface 100 contains user interface elements such as a text box 102, in which text to be translated from a first source language (e.g., German) to a second target language (e.g., English) can be specified, a drop-down list 104 and a translate button 106 which can be used to submit the translation request, as specified in the drop-down list 104. For example, the translate button 106 can receive input (e.g., from a computer mouse or other input device), and in response text within the text box 102 is submitted to the translation engine.

The user interface 100 can also provide options to request a translation of a web page or other resource from a first language to a second language. A Uniform Resource Locator (URL) of a web page or resource to be translated can be specified in an input box 108, and a language to translate to/from can be specified using a second drop-down list 110. A second translate button 112 can be used to submit the translation request. For example, the second translate button 112 can receive input (e.g., from a computer mouse or other input device), and in response, the web page contained at the specified URL is submitted to the translation engine.

Figure 2:
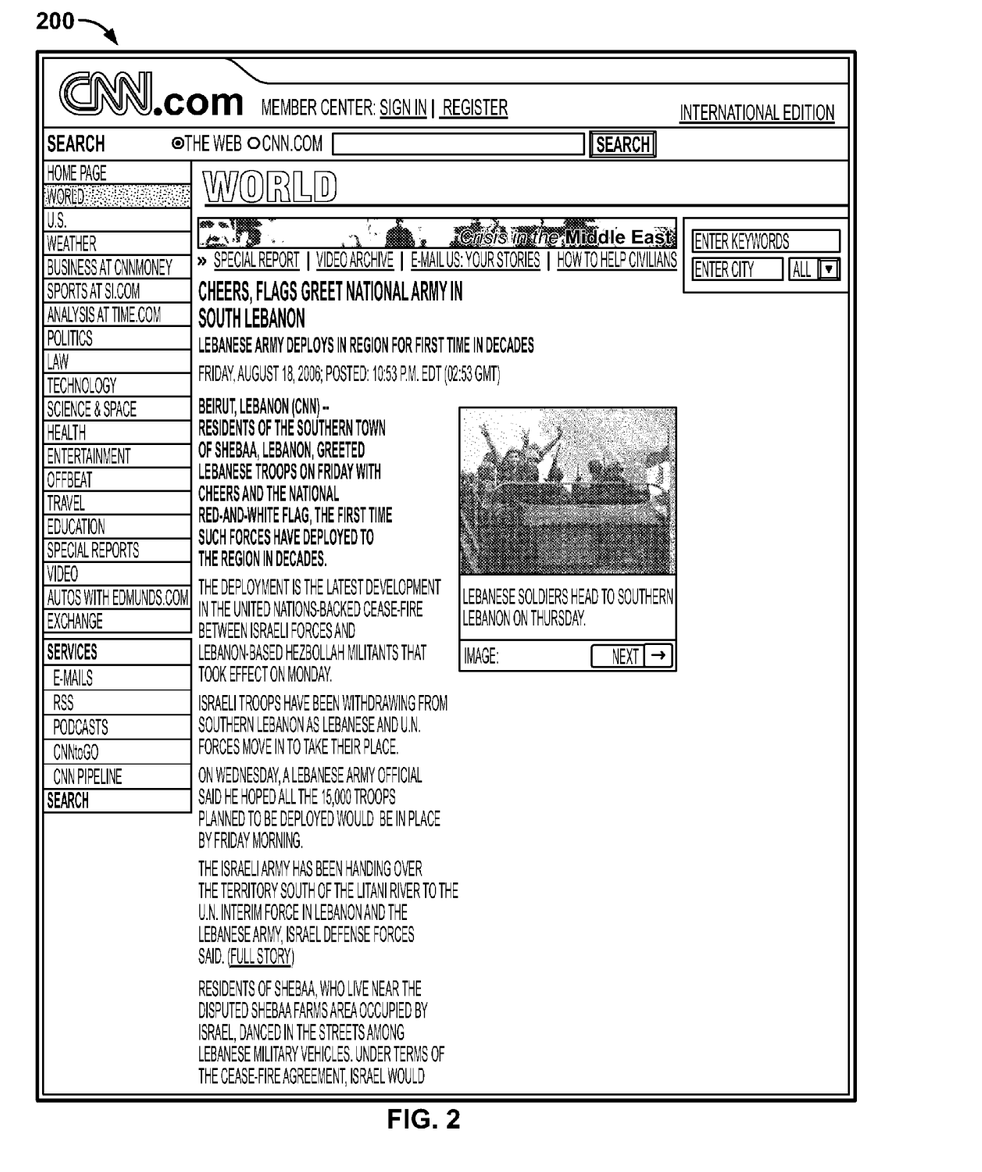
FIG. 2 illustrates a resource in a first language.

FIG. 2 illustrates an example of a web page 200 in a first language (e.g., English). To translate the web page 200 to a second language (e.g., Arabic), a user enters the URL of the web page (e.g., http://www.cnn.com) into the user interface input box 108 and selects a to/from translation language pair using the drop-down list 110. The user then submits the request using the translate button 112. The web page 200 is then translated into a second language, as selected by the user in the drop-down list 112.

Figure 3:
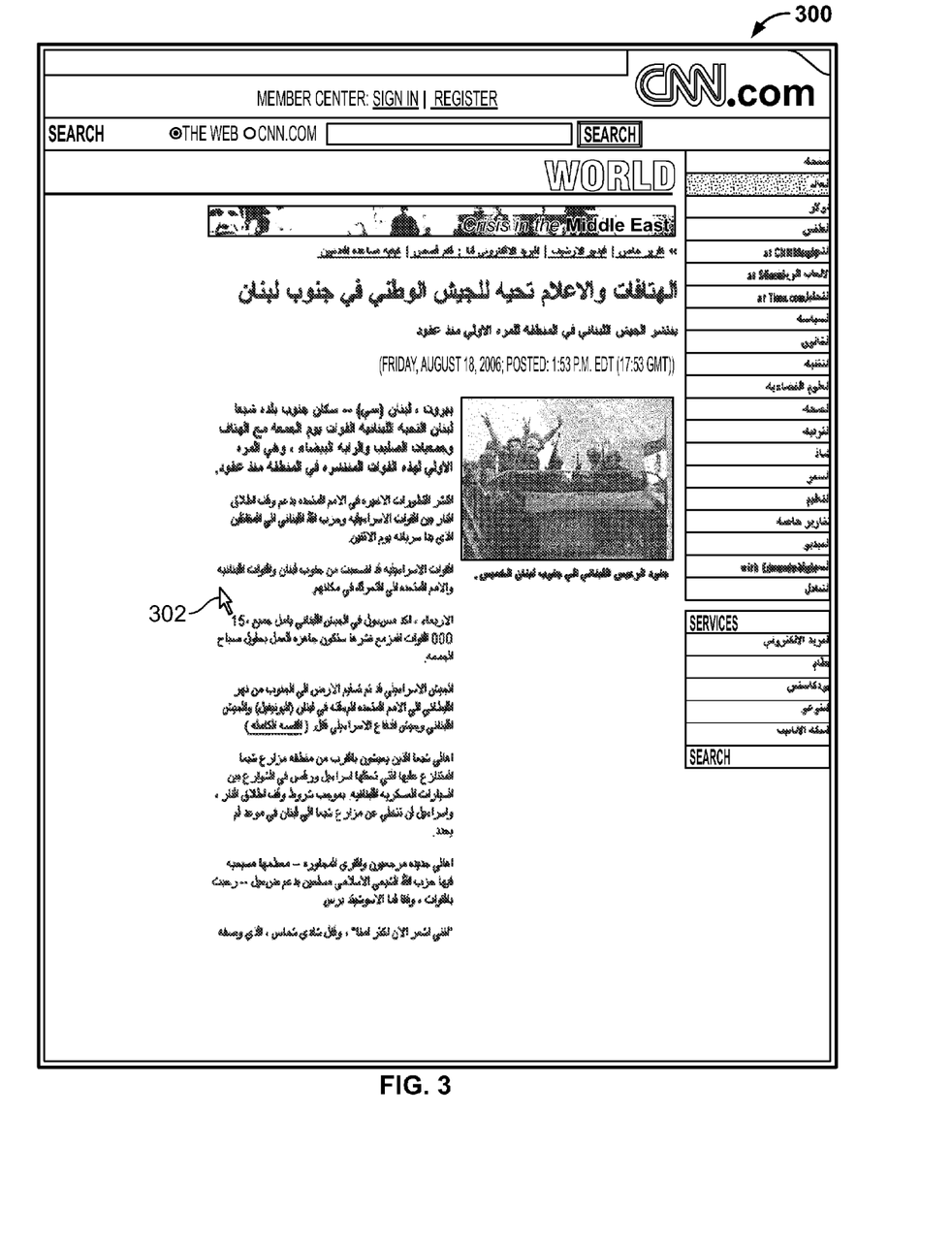
FIG. 3 illustrates the resource of FIG. 2 translated to a second language.

FIG. 3 is the web page 200 as translated into an exemplary translated web page 300 where the user selected English to Arabic in the drop-down list 110. The translated web page 300 is presented to the user in the user interface after the user submits the web page 200 for translation by the translation engine. In the example translated web page 300, the second language (e.g., Arabic) is read from right-to-left, whereas the first language (e.g., English) is read from left-to-right. Accordingly, the structure of the translated page 300 is reformatted to be read from right-to-left. In some implementations where the original text is left-to-right, the style attribute of elements in the translated web page are set to "direction: rtl; align: right" to affect the direction and alignment of text and tables. In some implementations, when the second language is read from left-to-right, the structure of the formatting of the translated page 300 can remain the same as the formatting of the web page 200.

In some implementations, each sentence in the translated version of an HTML document that defines the web page 300 is surrounded with span tags with the title attribute set to the untranslated version of that sentence. For example: <span title="Untranslated sentence.">Translated sentence.</span>. Such an implementation causes a behavior in some web browsers, such as Internet Explorer and Mozilla Firefox, of displaying such text as a tooltip. Similar mechanisms can be used for other document formats such as word processing formats, Portable Document Format (PDF), and others. In some implementations, the translation engine delimits text structures such as words, paragraphs, or portions of a page with span tags. In some implementations, the translation engine delimits two or more sentence fragments with span tags. For example, "This is a sentence. This is another." can is surrounded by span tags to provide access to the untranslated text of both sentences at the same time.

Figure 4:
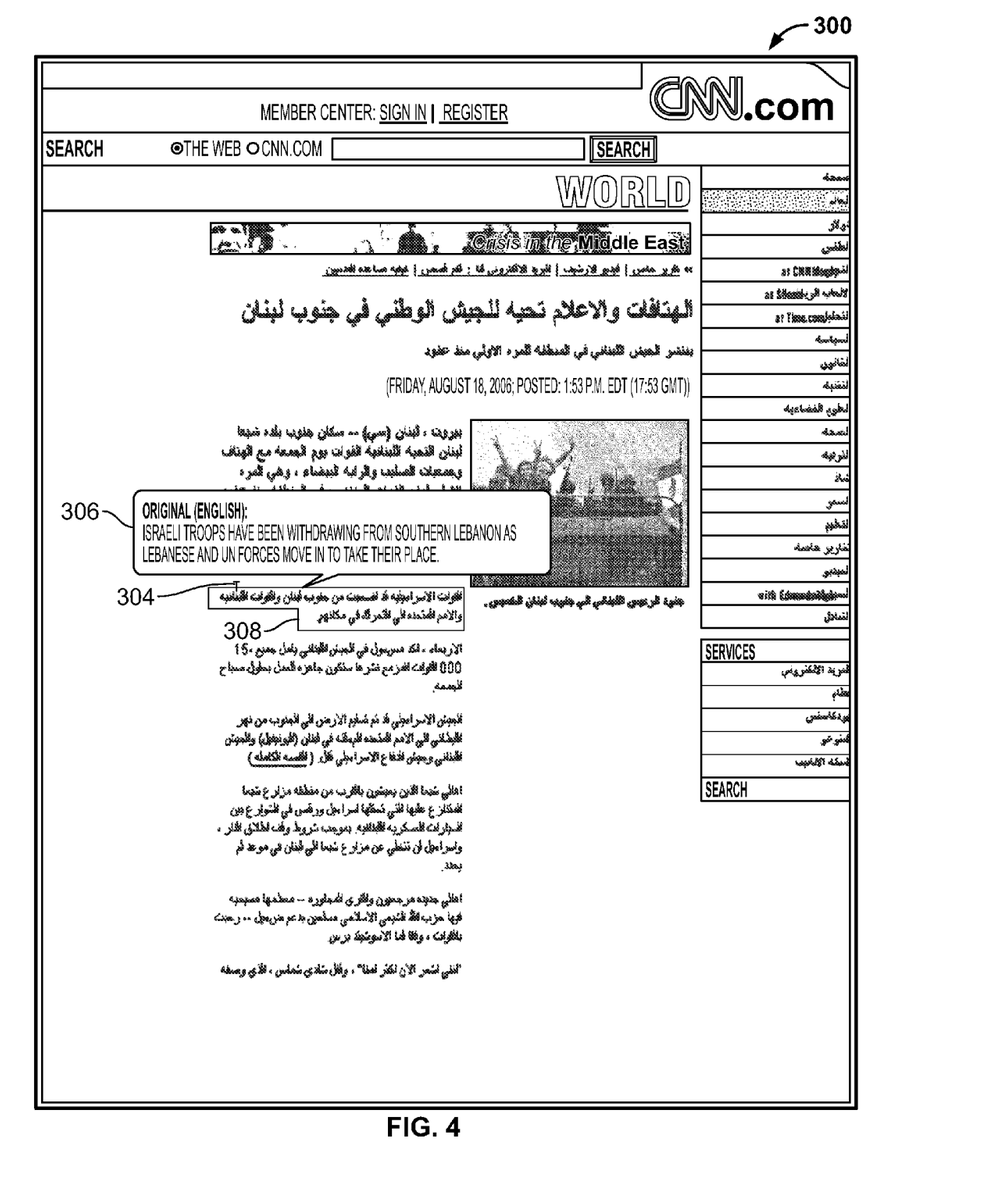
FIG. 4 illustrates a the resource of FIG. 3 in which a portion of original text is displayed.

To display a portion of the original text, a user can position a pointer 302 close to a portion of the translated text using a mouse or other pointing device. As shown in FIG. 4, moving the pointer 302 such that it hovers over the text for a predetermine period of time triggers the onmouseover JavaScript trigger of that sentence (or other portion of text) onmouseover JavaScript trigger. The trigger uses Window.setTimeout to establish, e.g., a 500 ms delay before changing the cursor from a pointer 302 to a select text indicator 304. After the pointer changes to the indicator 304, the selected text is indicated by highlighting 308. A tooltip 306 graphical element is displayed in close proximity to the indicator 304 that shows the original text. In some implementations, the tooltip 306 indicates the original language (e.g., English).

If the user moves the indicator 304 out of the sentence, the indicator 304 changes back to a pointer 302 and an a onmouseout trigger is used to remove the tooltip 306. The Window.setTimeout function is used to set, e.g., 100 ms delay before removing the tooltip 306 after the trigger. The delay prevents rapid visual changes from occurring if the user moves the pointer 302 over a long distance. If the user moves the pointer 302 back to the previously selected sentence (or other portion of text) or moves the pointer 302 into the tooltip 306 during the delay period, the timeout is canceled. Thus is such that moving the pointer 302 across the empty space between lines of text or across the space between the text and the bubble does not cause the tooltip 306 to be removed.

By providing the original text in the form of a tooltip, which is a small window of text which appears when the user hovers over the translation, the user interface provides access the original text quickly when necessary, without distracting the user with the original text when it is not necessary. Thus, a clean, intuitive user interface is provided for text and web page translation, as well as convenient selection of the translation language pair.

It is possible that not all web pages will translate and format properly. In some implementations, CSS (Cascading Style Sheets), JavaScript, or <iframe>content . . . </iframe> techniques are used to generate a navigation frame, in order to provide feedback such as explanations of errors that are causing the page not to be translated properly. In some implementations, frames that make up original web page are removed when the translated page 300 is created by the translation engine.

Figure 5:
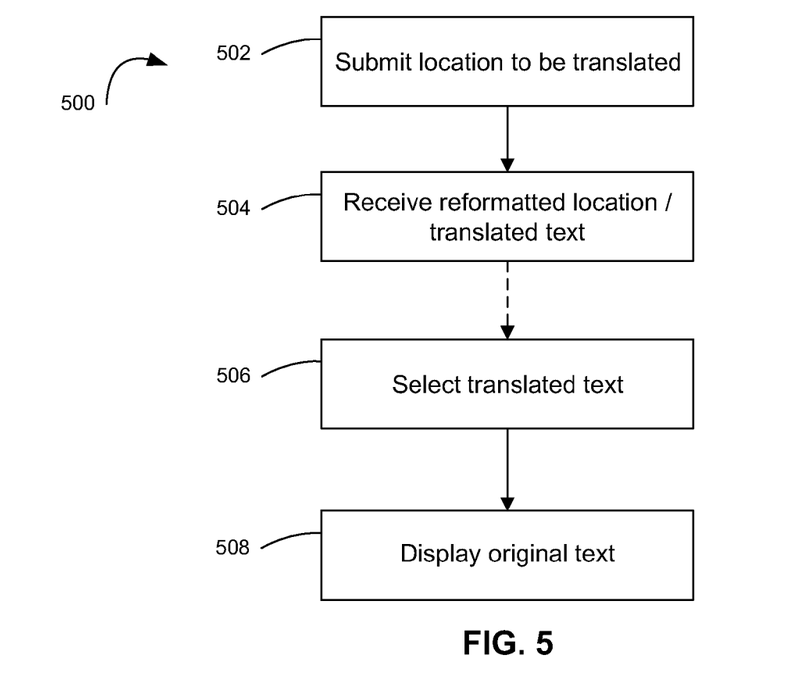
FIG. 5 is a flow diagram of a method for requesting and receiving translations.

FIG. 5 is a flow diagram of a method 500 for requesting and receiving translations. Initially, a resource to be translated is specified and submitted to a translation engine (step 502). As noted above, the resource to be translated can be specified in the form of a URL or other identifier, which can specify, e.g., a web page, a document, an image, or other resource. A translated and/or reformatted version of the resource is received from the translation engine (step 504). To display the original text corresponding to the translated text or a portion of the translated text, a portion of the translated text, as defined by the span tags, is selected (step 506). The original text that corresponds to the selected translated text is then displayed in the user interface (step 508).

Figure 6:
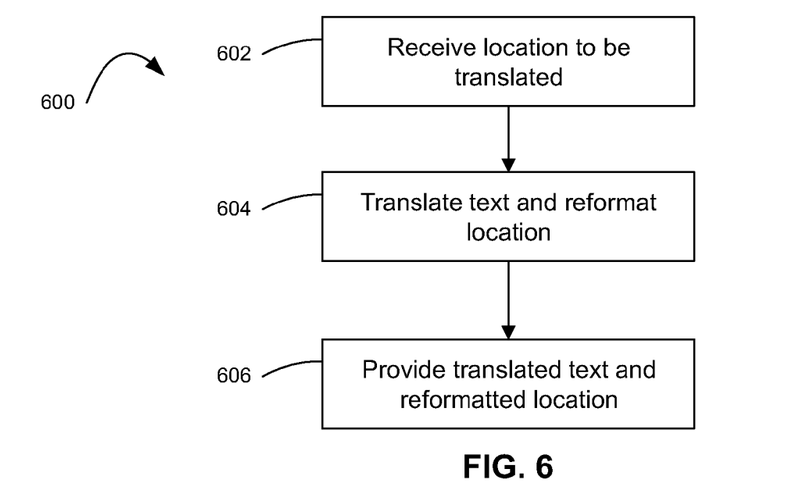
FIG. 6 is a flow diagram of a method for receiving and processing requests to translate locations.

FIG. 6 is a flow diagram of a method 600 for receiving and processing requests to translate resources A location of the resource is received from in the form of, e.g., a URL or other identifier, and a translation language pair (step 602). The location is accessed and a, e.g., web page or document, at that address is retrieved. The text is translated from a specified first language to a specified second language, and the page structure reformatted, if necessary (step 604). As part of the reformatting process, predetermined translated text structures (e.g., words, sentences, paragraphs, tabular columns/rows) are delimited by span tags with the title attribute set to the untranslated version of that sentence to induce a behavior in the client viewing the translated location. The translated text and/or reformatted resource is communicated to the requestor (step 606).

Figure 7:
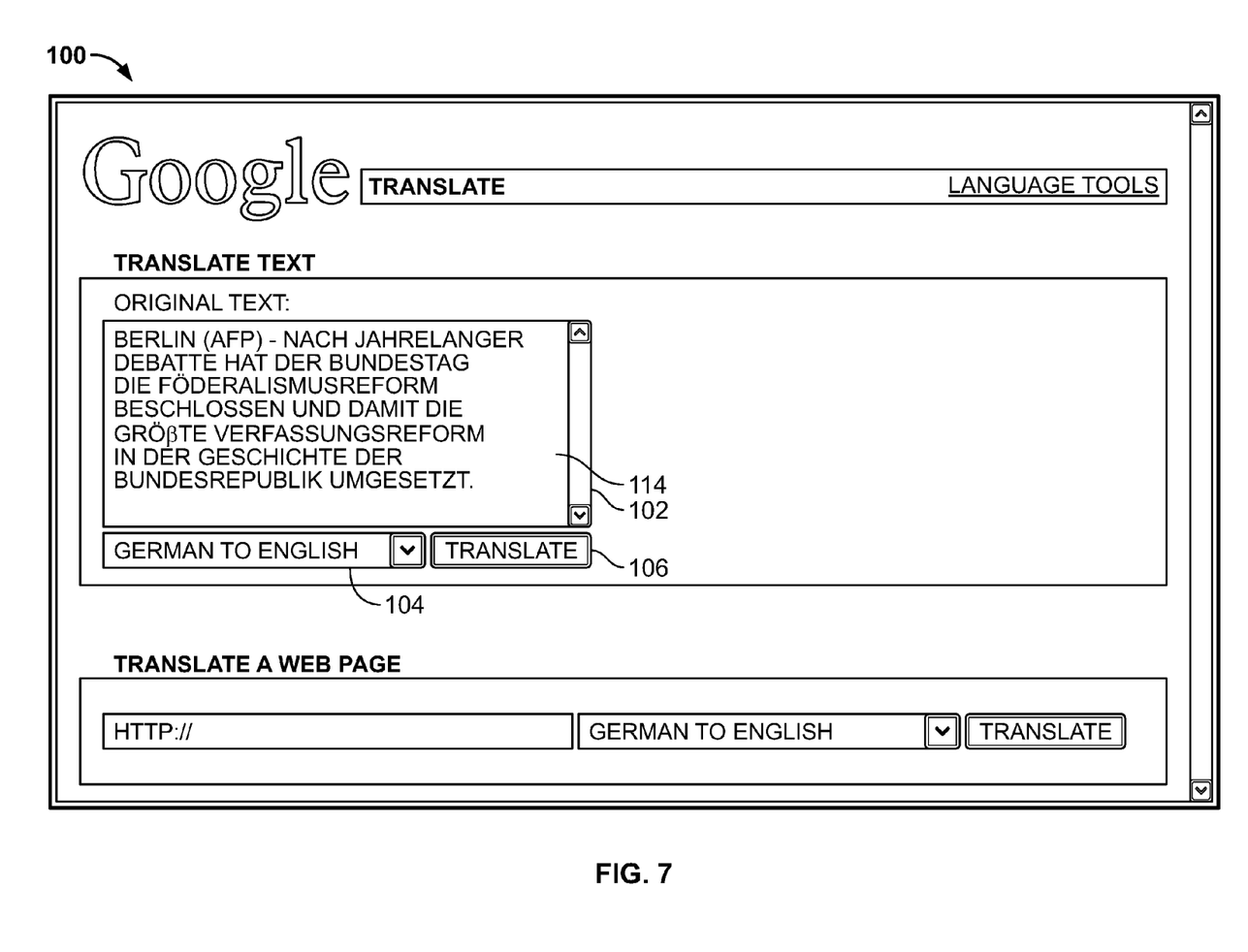
FIG. 7 illustrates an example translation engine user interface including text to be translated.
Figure 8:
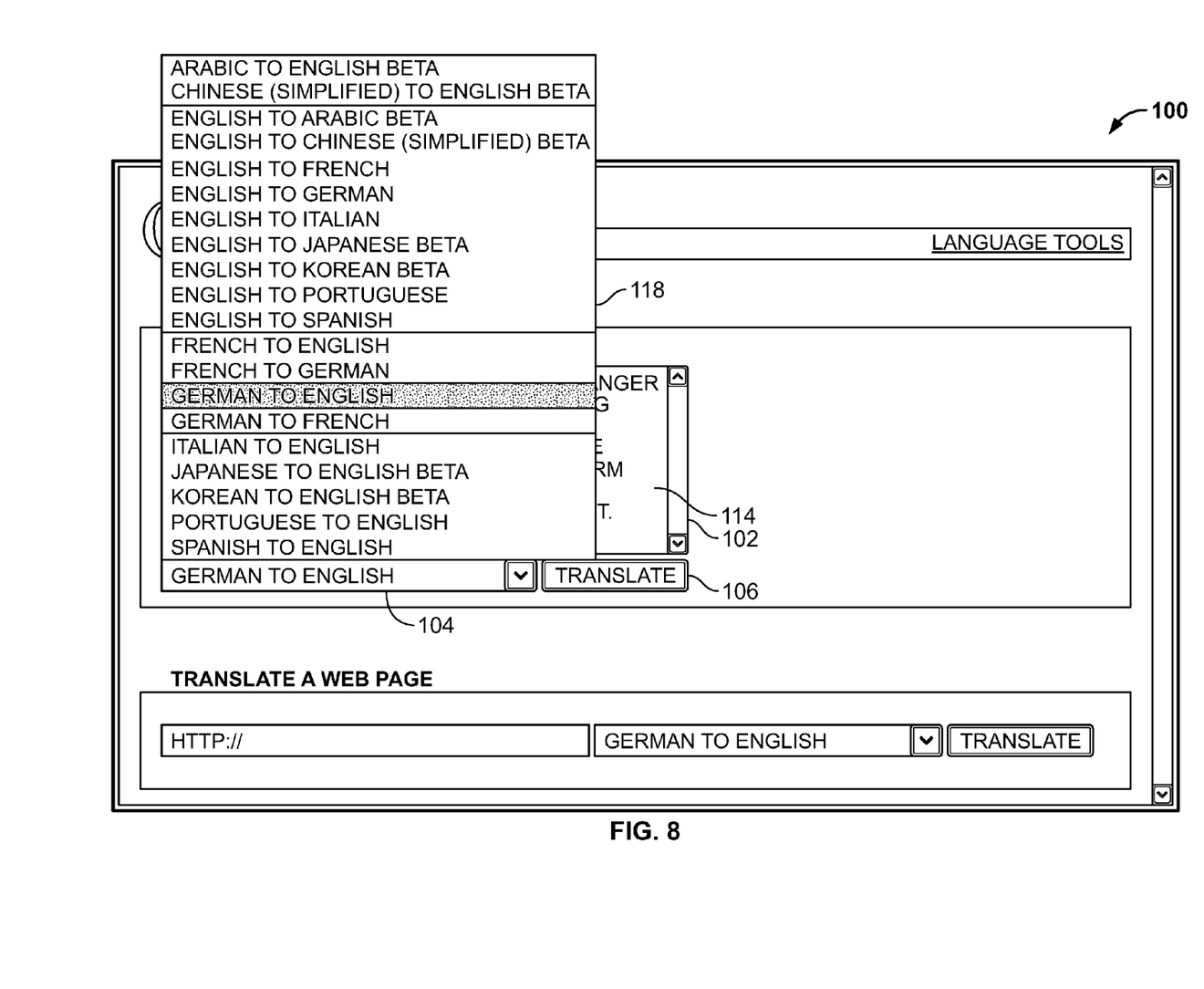
FIG. 8 illustrates the user interface of FIG. 7 displaying translation language pairs.
Figure 9:
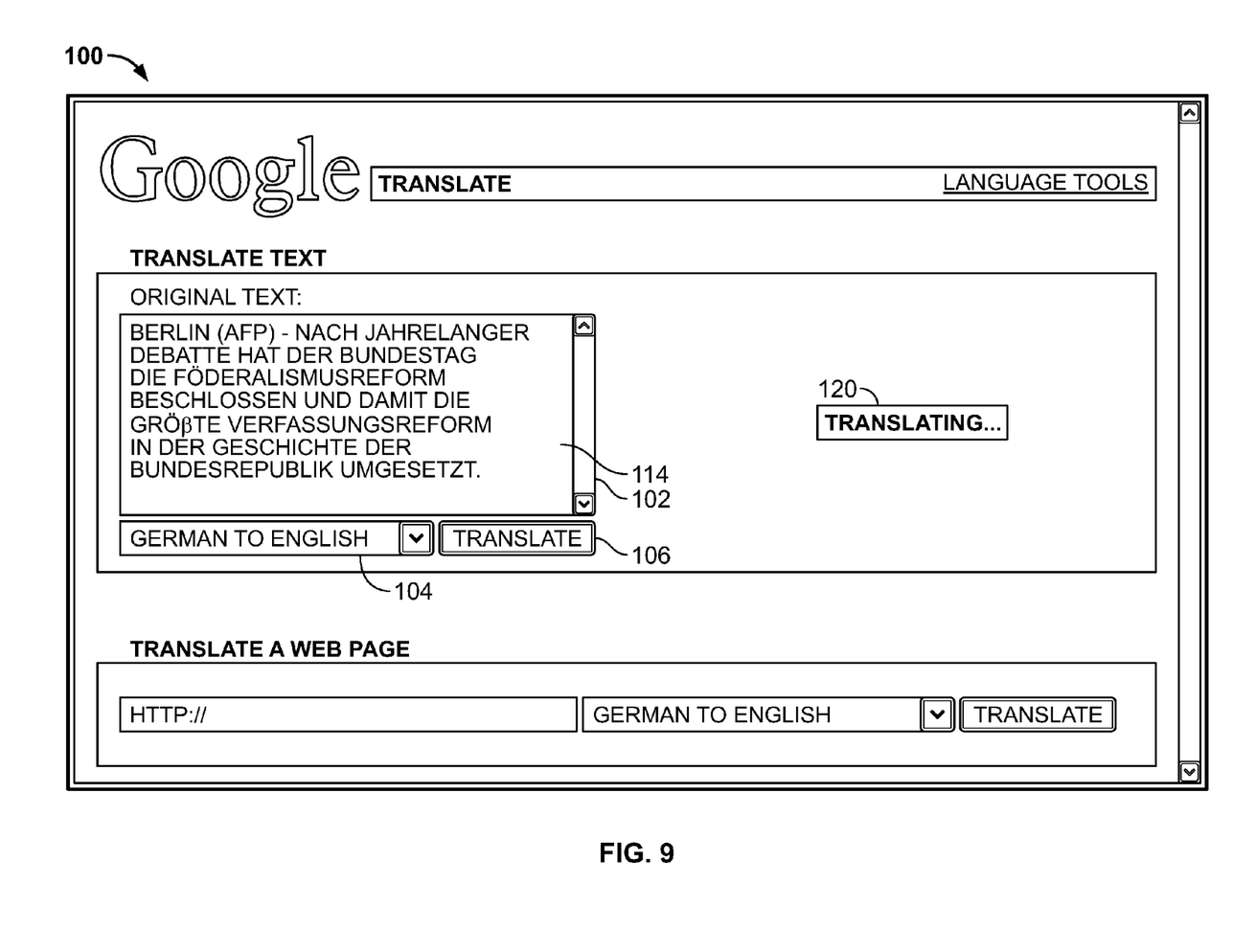
FIG. 9 illustrates the user interface of FIG. 7 displaying a translation in progress.
Figure 10:
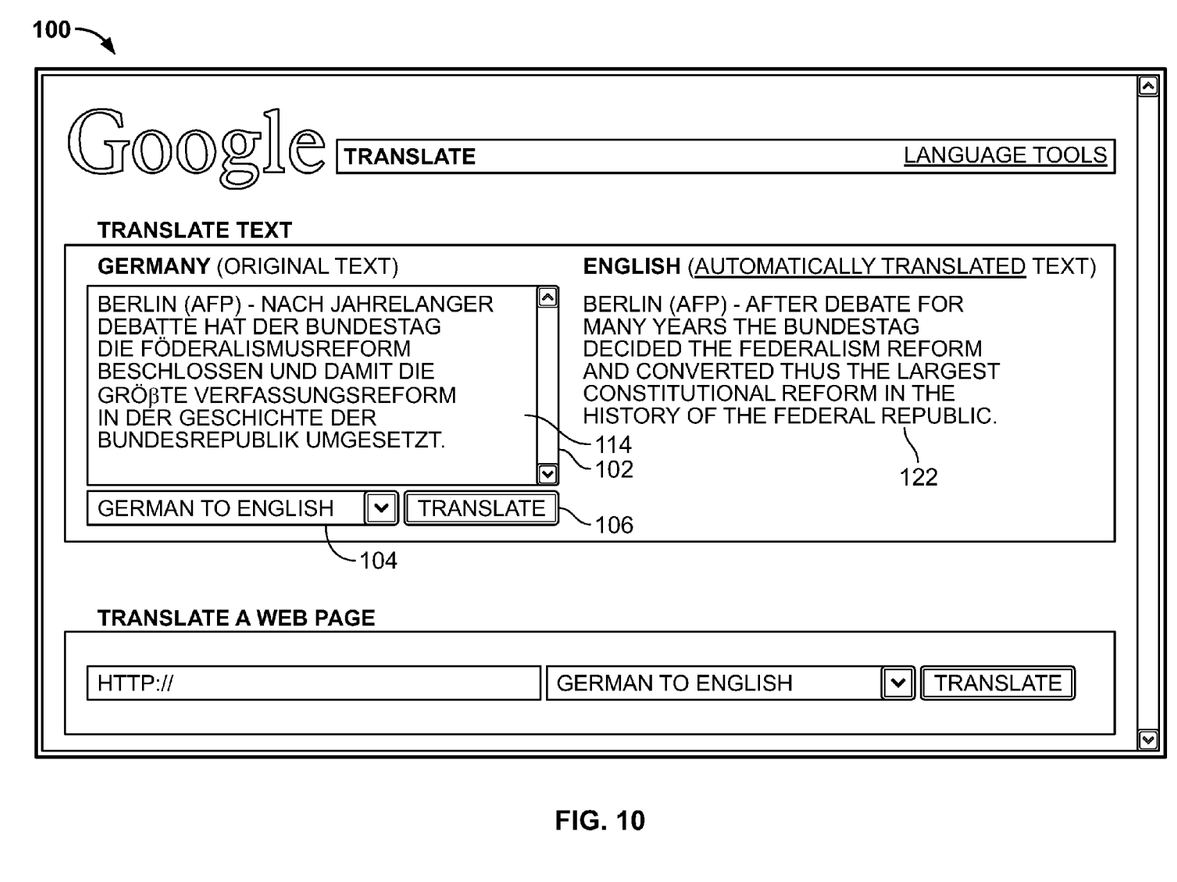
FIG. 10 illustrates the user interface of FIG. 7 displaying translated text.

FIG. 7 illustrates an example of the user interface 100 where text 114 is entered into the text box 102 to be translated from a first language to a second language, as specified in the drop-down box 104. As shown in FIG. 8. the user can specify the particular to/from translation language pair by selecting the down arrow 116 (e.g., from a computer mouse or other input device) and supported translation language pairs are shown in the list 118. After selecting a translation language pair (e.g., German to English), the request is submitted using the translate button 106. As shown in FIG. 9, while the request is processed, the user can receive feedback in the form of a status box 120. As shown in FIG. 10, translated text 122 can be provided in a pane next to the original text 114 for rapid viewing. The translated text 122 can be provided to the user interface 100 using Asynchronous JavaScript and XML (AJAX), where small amounts of data are exchanged with a server, so that the user interface 100 does not have to be reloaded each time the user makes a request using the translate button 106. In other implementations, the original and translated text can be displayed top-to-bottom.

Figure 11:
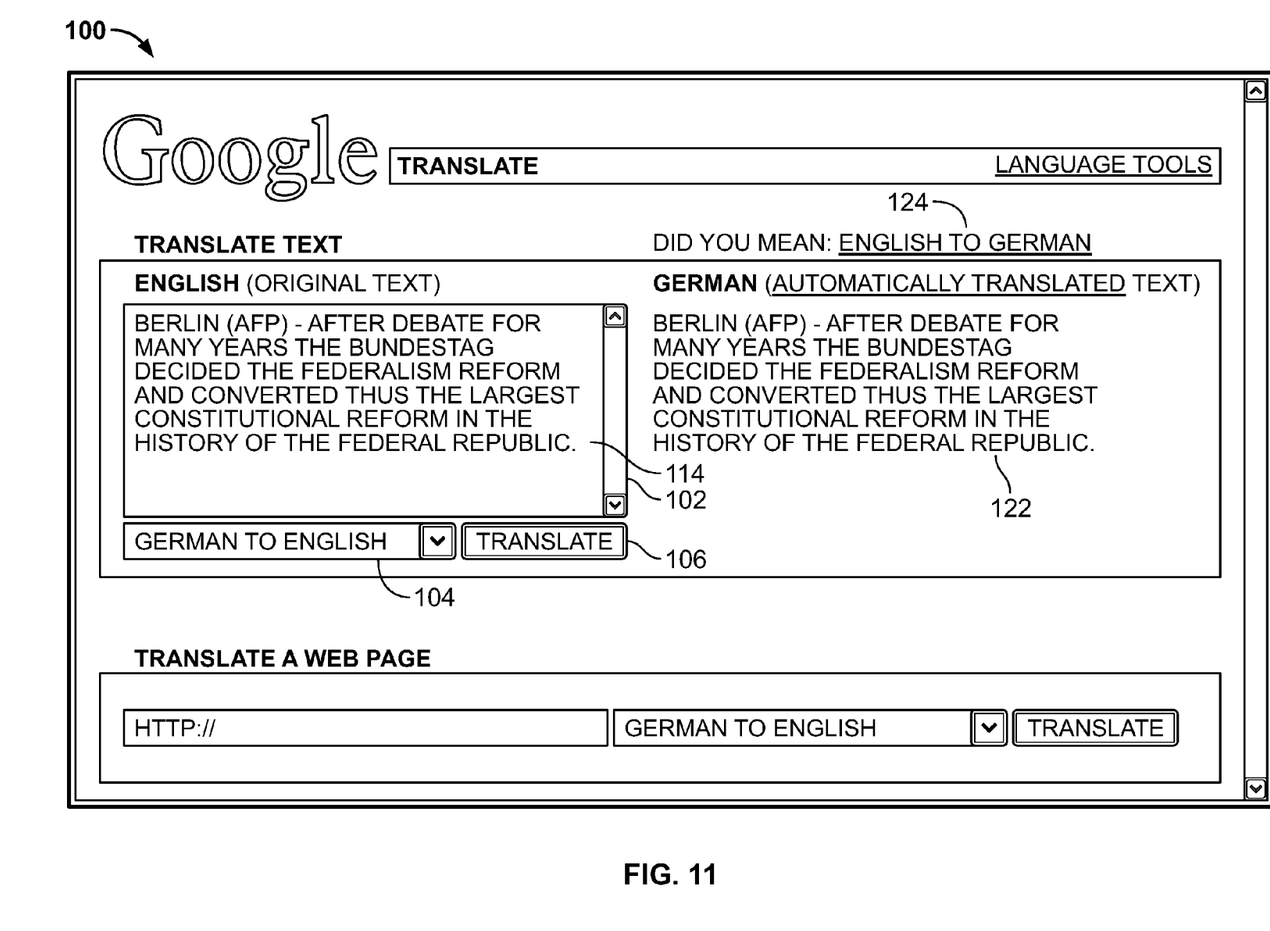
FIG. 11 illustrates the user interface of FIG. 7 displaying a suggested translation language pair.

FIG. 11 illustrates the user interface of FIG. 7 displaying a suggested translation language pair. In FIG. 11, text 114 has been entered in a language that does not correspond to the selected translation language pair. For example, the entered text 114 to be translated is in English, however the drop down box 104 indicates a translation selection of German to English. When translate button 106 is selected, the translation engine can determine that the selection in the drop down box 104 is not appropriate for the entered text and can provide a suggested translation language pair 124 that is more appropriate.

A button or other user interface element can be provided that a user can select to cause the translated text 122 or a portion of it to be copied into the clipboard.

JavaScript code in the translated resource can instruct the user interface to create a panel with fixed positioning near the translated text. In some implementations, the original text is displayed in the panel allowing the user to select and copy the original text using a mouse or other pointing device and edit commands provided by the browser. In some implementations, alternative translations for a phrase entered by a user are provided by the translation engine and displayed in the panel. In some implementations, JavaScript code instructs the browser to display a feedback mechanism in the panel allowing the user to rate the quality of the translation. In some implementations, JavaScript code instructs the browser to display a selection mechanism to choose between multiple translation language pair candidates.

In some implementations, formatting of the original text 114 can be preserved in the translated text 122. For example, font attributes, new lines, tabs, and other formatting features can be applied to the translated text 122.

Figure 12:
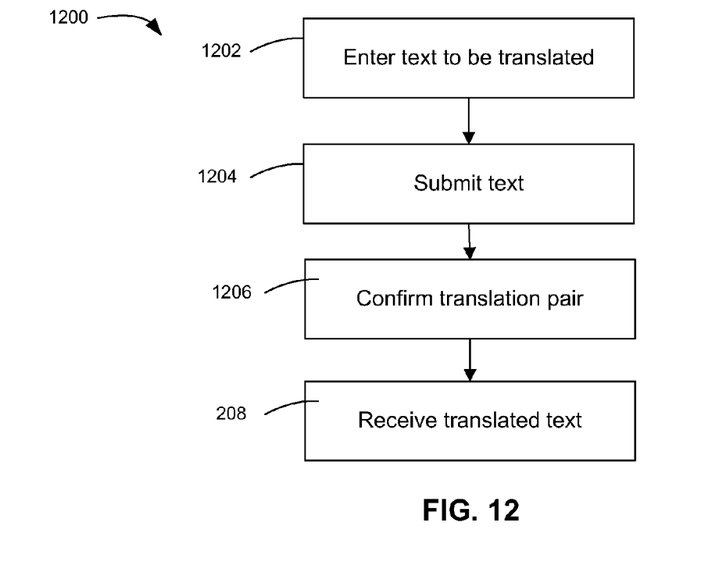
FIG. 12 is a flow diagram of a method for text translation.

FIG. 12 illustrates a flow diagram of a method 1200 for text translation. Text is entered into an element of a user interface (step 1202). The text is submitted to a translation engine with an indication of a translation language pair (step 1204). Error detection can be performed to determine if the translation language pair corresponds with the entered text, and a status can be provided to the requestor indicating that the translation processes is proceeding (step 1206). The translated text is received and presented in another element of the user interface (step 1208).

Figure 13:
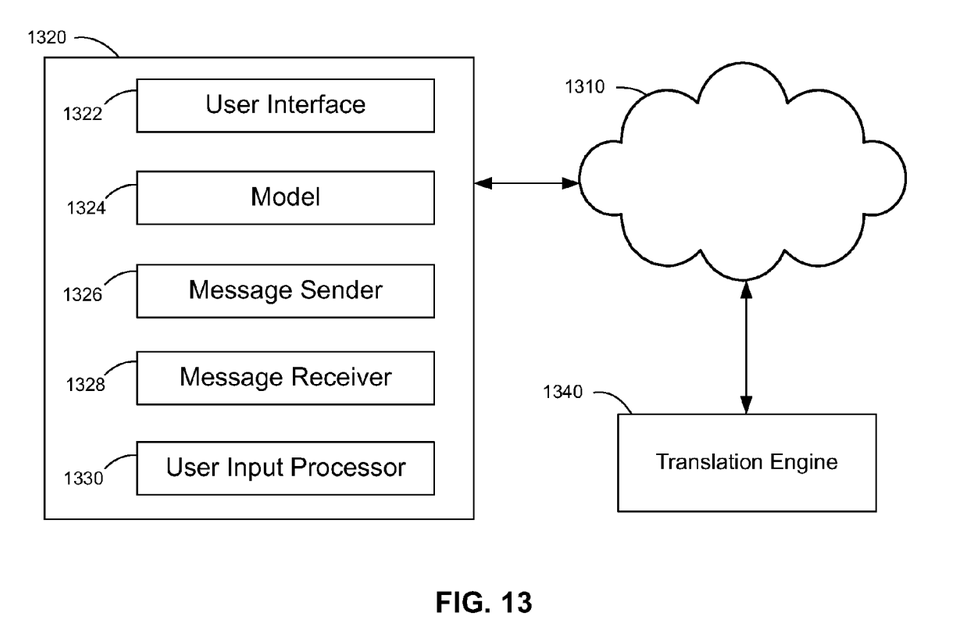
FIG. 13 is a block diagram of a client and a translation engine.

FIG. 13 is a block diagram of a client 1320 and a translation engine 1340. The translation engine 1340 is connected to one or more networks 1310 such as the Internet and can communicate with various clients 1320 that are also connected to the network 1310 (e.g., using a communication protocol such as HTTP (Hypertext Transport Protocol)). The communication flow between the client 1320 and translation engine 1340 is bidirectional so that the translation engine 1340 receives information (e.g., text and/or an identification of resources to be translated) from the client and sends information (e.g., results in the form of translated text and/or resources) to the client 1320. In some implementations, the translation engine 1340 implements rule-based methods to parse text from a source language to a target language.

The client 1320 includes a message receiver 1328 that facilitates communication with the network and can receive encoded user interface elements and translated items (e.g. encoded in an HTML document) from the translation engine 1340 through the network 1310. Messages are processed by the client to produce a model 1324 of the user interface. The model 1324 (e.g., the syntax tree of an HTML document) describes the content received by the message receiver 1328. The model 1324 is, in whole or in part, presented in a user interface 1322 included with the client 1320 (e.g., a display surface on a device, a drawing surface in a web browser application). User input is received from a user input processor 1330 that can receive input from an input device (e.g., keyboard, touch screen, mouse, track pad, camera, microphone).

The user input processor 1330 allows for user interaction with the user interface 1322. For example, input from the input processor 1330 can be used to specify a request to translate text and/or documents. Requests can be encoded and provided to the translation engine 1340 through the network 1310 by the message sender 1326.

Implementations of the functional operations described in this specification can be implemented in digital electronic circuitry, or in computer software, firmware, or hardware, including the structures disclosed in this specification and their structural equivalents, or in combinations of one or more of them. Implementations can be realized as one or more computer program products, i.e., one or more modules of computer program instructions encoded on a computer-readable medium for execution by, or to control the operation of, data processing apparatus. The computer-readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

While this specification contains many specifics, these should not be construed as limitations of what may be claimed, but rather as descriptions of features specific to particular implementations. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular implementations have been described and other implementations are within the scope of the following claims. For example, the actions recited in the claims can be performed in a different order and still achieve desirable results.

What is claimed is:

1. A method comprising:
   receiving, using one or more processors, a user request to translate a source web document from a first language text to a second language text;
   generating a translated web document containing a translation of the source web document into the second language text;
   presenting the translated web document to the user; and
   displaying the first language text that corresponds to a portion of the translated web document in a graphical element overlaying the translated web document in response to the user pointing to the portion of the translated web document.

2. The method of claim 1, further comprising:
   displaying the first language text after a predetermined period of time has elapsed after the user points to the portion of the translated document;
   removing the display of the first language text after a second predetermined period of time has elapsed after a user ceases to point to the portion of the translated document; and
   canceling the removal of the display of the first language text if the user again points to the portion of the translated document before the second predetermined period of time has elapsed.

3. The method of claim 1, further comprising:
   receiving feedback from the user regarding the translation.

4. The method of claim 1, further comprising:
   formatting the translated web document based on the second language, where the formatting is used to present the translated web page.

5. A method comprising:
   sending, using one or more processors, a request to translate a source web document from a first language text to a second language text;
   receiving a translated web document for display containing a translation of the source web document into the second language text;
   displaying the translated web document; and
   in response to interacting with a portion of the translated web document, displaying the first language text that corresponds to a portion of the translated web document in a graphical element overlaying the translated web document.

6. The method of claim 5, further comprising:
   displaying the first language text after a predetermined period of time has elapsed after the user points to the portion of the translated document;
   removing the display of the first language text after a second predetermined period of time has elapsed after a user ceases to point to the portion of the translated document; and
   canceling the removal of the display of the first language text if the user again points to the portion of the translated document before the second predetermined period of time has elapsed.

7. The method of claim 5, further comprising displaying the first language text in the graphical element according to span tags delimiting the portion of the translated text.

8. The method of claim 5, where sending the request includes entering a uniform resource locator into a field of a presented translation interface and identifying the second language.

9. A system comprising:
one or more computing devices configured to perform operations including:
receiving, using one or more processors, a user request to translate a source web document from a first language text to a second language text;
generating a translated web document containing a translation of the source web document into the second language text;
presenting the translated web document to the user; and
displaying the first language text that corresponds to a portion of the translated web document in a graphical element overlaying the translated web document in response to the user pointing to the portion of the translated web document.

10. The system of claim 9, further configured to perform operations comprising:
displaying the first language text after a predetermined period of time has elapsed after the user points to the portion of the translated document;
removing the display of the first language text after a second predetermined period of time has elapsed after a user ceases to point to the portion of the translated document; and
canceling the removal of the display of the first language text if the user again points to the portion of the translated document before the second predetermined period of time has elapsed.

11. The system of claim 9, further configured to perform operations comprising:
receiving feedback from the user regarding the translation.

12. The system of claim 9, further configured to perform operations comprising:
formatting the translated web document based on the second language, where the formatting is used to present the translated web page.

13. A system comprising:
one or more computing devices configured to perform operations including:
sending, using one or more processors, a request to translate a source web document from a first language text to a second language text;
receiving a translated web document for display containing a translation of the source web document into the second language text;
displaying the translated web document; and
in response to interacting with a portion of the translated web document, displaying the first language text that corresponds to a portion of the translated web document in a graphical element overlaying the translated web document.

14. The system of claim 13, further configured to perform operations comprising:
displaying the first language text after a predetermined period of time has elapsed after the user points to the portion of the translated document;
removing the display of the first language text after a second predetermined period of time has elapsed after a user ceases to point to the portion of the translated document; and
canceling the removal of the display of the first language text if the user again points to the portion of the translated document before the second predetermined period of time has elapsed.

15. The system of claim 13, further configured to perform operations comprising displaying the first language text in the graphical element according to span tags delimiting the portion of the translated text.

16. The system of claim 13, where sending the request includes entering a uniform resource locator into a field of a presented translation interface and identifying the second language.

17. A computer readable medium storing instructions that upon execution by a processing device cause the processing device to perform operations, comprising:
receiving, using one or more processors, a user request to translate a source web document from a first language text to a second language text;
generating a translated web document containing a translation of the source web document into the second language text;
presenting the translated web document to the user; and
displaying the first language text that corresponds to a portion of the translated web document in a graphical element overlaying the translated web document in response to the user pointing to the portion of the translated web document.

18. The computer readable medium of claim 17, further including instructions that upon execution cause the processing device to perform operations comprising:
displaying the first language text after a predetermined period of time has elapsed after the user points to the portion of the translated document;
removing the display of the first language text after a second predetermined period of time has elapsed after a user ceases to point to the portion of the translated document; and
canceling the removal of the display of the first language text if the user again points to the portion of the translated document before the second predetermined period of time has elapsed.

19. The computer readable medium of claim 17, further including instructions that upon execution cause the processing device to perform operations comprising:
receiving feedback from the user regarding the translation.

20. The computer readable medium of claim 17, further including instructions that upon execution cause the processing device to perform operations comprising:
formatting the translated web document based on the second language, where the formatting is used to present the translated web page.

21. A computer readable medium storing instructions that upon execution by a processing device cause the processing device to perform operations, comprising:
sending, using one or more processors, a request to translate a source web document at a location from a first language text to a second language text, the request including a uniform resource locator corresponding to the source web document;
receiving a translated web document for display containing a translation of the source web document into the second language text;
displaying the translated web document; and
in response to interacting with a portion of the translated web document, displaying the first language text that corresponds to a portion of the translated web document in a graphical element overlaying the translated web document.

22. The computer readable medium of claim 21, further including instructions that upon execution cause the processing device to perform operations comprising:

displaying the first language text after a predetermined period of time has elapsed after the user points to the portion of the translated document;

removing the display of the first language text after a second predetermined period of time has elapsed after a user ceases to point to the portion of the translated document; and canceling the removal of the display of the first language text if the user again points to the portion of the translated document before the second predetermined period of time has elapsed.

23. The computer readable medium of claim 21, further including instructions that upon execution cause the processing device to perform operations comprising displaying the first language text in the graphical element according to span tags delimiting the portion of the translated text.

24. The computer readable medium of claim 21, where sending the request includes entering a uniform resource locator into a field of a presented translation interface and identifying the second language.

* * * * *